United States Patent [19]
Wood

[11] 3,954,029
[45] May 4, 1976

[54] ROLLER TYPE EPICYCLIC DRIVE

[76] Inventor: Samuel Robert Wood, 3 Raymond Ave., Warrawee, New South Wales, Australia, 2074

[22] Filed: Dec. 17, 1974

[21] Appl. No.: 533,509

[30] Foreign Application Priority Data
Jan. 4, 1974 Australia............ 64204/74

[52] U.S. Cl..................... 74/798; 74/63; 74/190
[51] Int. Cl.[2]......................... F16H 13/10
[58] Field of Search............ 74/798, 190, 63

[56] References Cited
UNITED STATES PATENTS

| | | | |
|---|---|---|---|
| 2,815,685 | 12/1957 | Parrett | 74/798 |
| 2,896,480 | 7/1959 | Michie | 74/798 |
| 3,248,960 | 5/1966 | Schottler | 74/798 X |
| 3,889,554 | 6/1975 | Sinclair et al. | 74/798 |

FOREIGN PATENTS OR APPLICATIONS

| | | | |
|---|---|---|---|
| 152,288 | 6/1921 | United Kingdom | 74/798 |

Primary Examiner—Benjamin W. Wyche
Assistant Examiner—F. D. Shoemaker
Attorney, Agent, or Firm—D. Paul Weaver

[57] ABSTRACT

A fixed ratio mechanical drive employing the tractive affect of rollers under pressure to transmit torque between co-axial members, including a means of obtaining the improved tractive engagement between rolling surfaces. The drive includes a first shaft in rolling contact with a number of equally spaced apart rollers on offset pins hinged in a second shaft, the improved traction being obtained by causing the rollers to rotate within a helicoidal component housed in a segmental locating ring having opposed conical shoulders co-operating with an adjacent ring and sleeve maintained under axial spring pressure resulting in tractive engagement between the helicoidal component, rollers and the first shaft.

8 Claims, 5 Drawing Figures

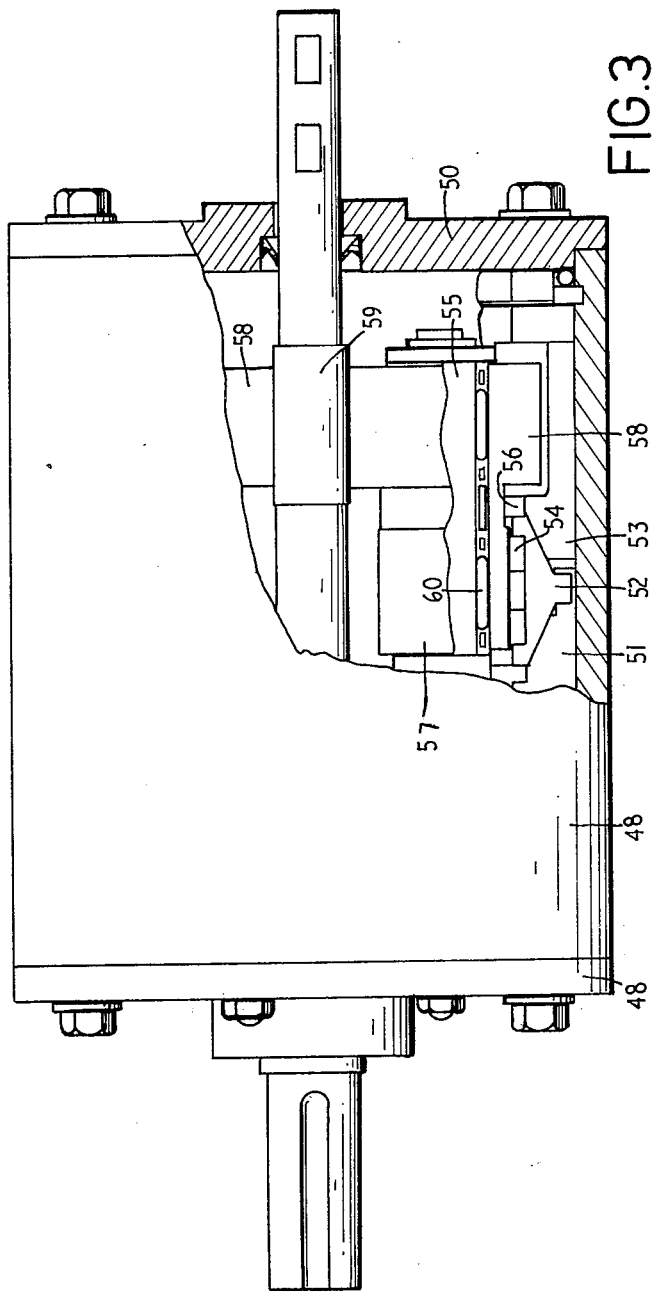

ROLLER TYPE EPICYCLIC DRIVE

This invention relates to fixed ratio epicyclic drives employing rollers to transmit rotary motion between co-axial input and output members. The invention has for its object the provision of improved means of applying pressure to the rolling surfaces to obtain tractive engagement.

These devices, in common with earlier forms in the same general class, provide a first shaft with a cylindrical working surface, an outer member with an internal working surface, and a second shaft co-axial with the first shaft, carrying an assembly of rollers each in engagement with the working surface of the first shaft and with the working surface of the outer member. Generally, the outer member including the casing is held stationary, drive input and output being to and from first and second shaft members or vice versa.

Means used in the past to apply pressure in order to load the working surfaces in devices of this type included one or more components of deformable elastomeric material, components of conical form under axial pressure, or ball cups in loaded angular contact. The present invention, however, provides a means for loading wherein the internal working surface of the outer member is contracted by using a helicoidal component housed in a segmental locating ring. In the preferred form this ring comprises a plurality of similar segments each having a conical external surface at each side thereof, the segments being assembled within a sleeve and ring which have opposed co-operating internal conical portions. Axial pressure is applied to the sleeve and accordingly radial pressure is applied to the helicoid and rollers. In order that this pressure be operative equally at the inner and outer working surfaces with which the rollers are in engagement, the rotational axis of each roller is arranged to be free to move in a generally radial direction while constrained circumferentially by the second shaft member.

According to the present invention, therefore, there is provided an epicyclic drive to transmit motion between members on a common rotational axis comprising a first shaft member in rolling contact with at least two equally spaced rollers rotatably mounted on pins carried in a second shaft member, said rollers being in rolling contact also with the inner surface of a component of helicoidal form contractibly mounted under pressure in an outer member and said pins being movable in a direction substantially radial with respect to the common axis whereby pressure is exerted at the surfaces in rolling contact so as to establish and maintain tractive engagement between the members.

The construction of the preferred forms of the device will become apparent from the following description and by reference to the accompanying drawings in which:

FIG. 3 is a part sectional view of a second typical form illustrating rollers having first and second diameters;

Figure 1:
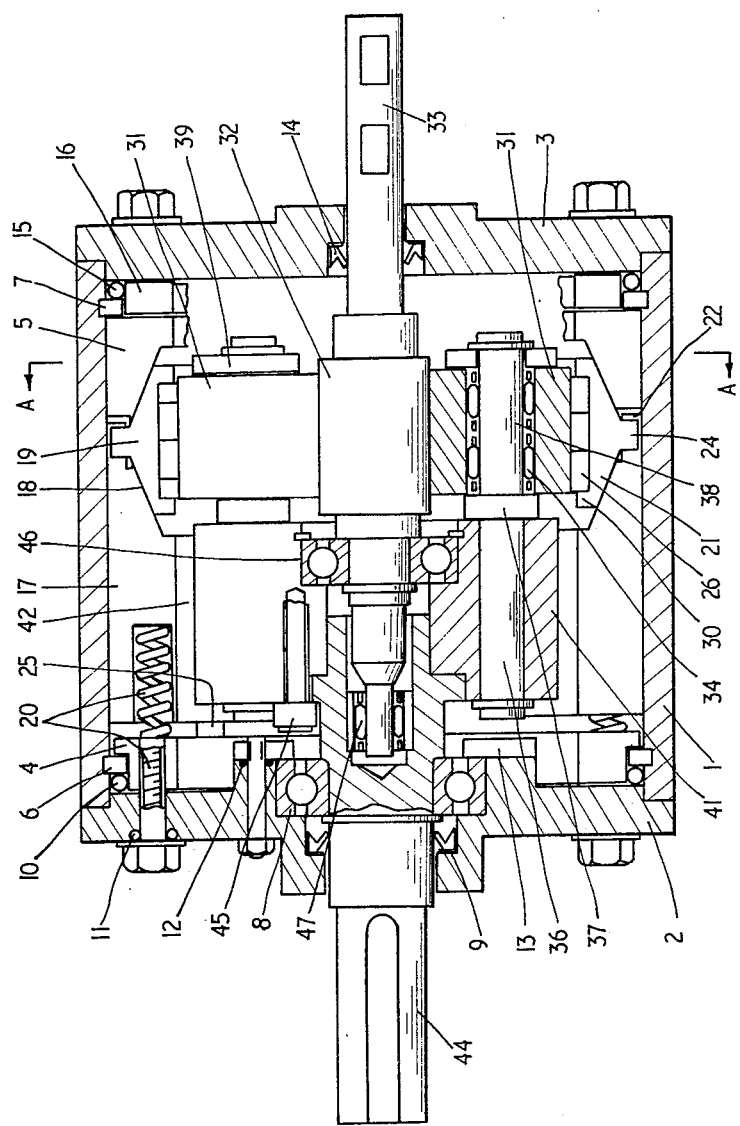
FIG. 1 is a sectional view of one typical form generally on line B—B of FIG. 2.

The devices may be constructed as an integral assembly as shown in FIGS. 1 and 3, or may be built into or be part of a driving or driven equipment.

Figure 2:
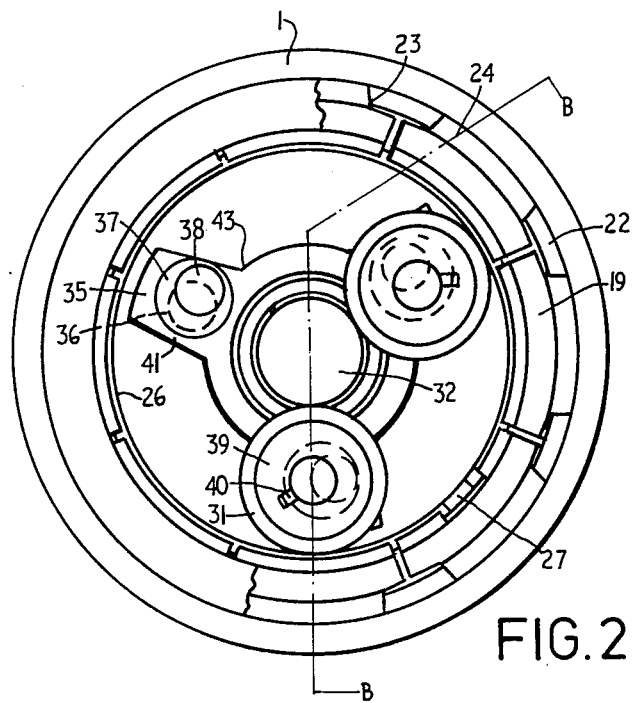
FIG. 2 is a broken sectional view generally on line A—A of FIG. 1.

Referring to FIGS. 1 and 2, a cylindrical casing 1 is closed by endplates 2 and 3 secured respectively to ring 4 and taper ring 5 abutting retainers 6 and 7. Endplate 2 houses bearing 8 and shaft seal 9, is itself sealed by 'O' ring 10 and carries bolt seals 11 and 12. Bearing 8 has fixed axial location by virtue of retainer 13. Endplate 3 carries shaft seal 14 and is sealed by O ring 15, being provided also with bolt seals similar to 11. Ring 16 serves to compress O ring 15. Contained within the casing 1 is pressure sleeve 17 with cylindrical inner and outer surfaces and having an internal conical surface 18 which is biased against segmental ring 19 by springs 20. Segmental ring 19 has external conical portions 21 co-operating at one side with surface 18 of pressure sleeve 17, whilst the other side co-operates with taper ring 5. The individual segments of ring 19 are located circumferentially by extensions 22 of pressure sleeve 17. As shown in FIG. 2 the extensions 22 have side cheeks 23 parallel to a line passing midway between the extensions: co-operating side cheeks are formed in the outer parallel portion 24 of the segments of ring 19. Torque is transmitted between pressure sleeve 17, ring 4, and endplate 2 by means of one or more sliding pins as indicated by 25. Segmental ring 19 houses helicoid 26 which is formed with parallel side cheeks to suit the segmental ring. The ends of helicoid 26 are preferably trimmed to remove the thin extremity. Ring 19 is provided with side clearance to permit change of diameter of helicoid 26. Although shown herein with conical external surfaces at each side, it is practicable to form segmental ring 19 with such a surface at one side only in which case the other side has an abutment with the adjacent ring or sleeve.

Figure 4:
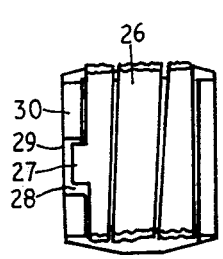
FIG. 4 is an internal view of a helicoid locating segment showing the keying of the helicoid.
Figure 5:
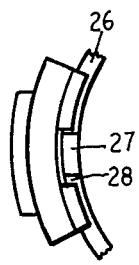
FIG. 5 is a side view of the segment and helicoid of FIG. 4.

As shown in FIGS. 4 and 5, tongues 27 are provided on helicoid 26 to prevent rotation of the helicoid within segmental ring 19. Tongues 27 have clearance indicated by 28 in slot 29 cut in the locating shoulder 30 of segmental ring 19. This clearance is left on the side of the slot nearest the helicoid extremity to permit take-up of the helicoid, both ends of which are keyed similarly. Because the keying and the closing action tends to be more effective with only a few turns of the helicoid, a plurality of helicoids may be mounted in the segmental ring when necessary to transmit the applied torque or to limit the surface stress, the ring then being provided additionally with a central shoulder.

Rollers 31 are equi-spaced circumferentially and rotate on and against helicoid 26 and are at the same time in engagement with working surface 32 which is part of first shaft 33. Rollers 31 are mounted on needle bearings 34 and cranked pins 35. Cranked pins 35 have a hinge portion 36, a web portion 37 and pin 38 which is offset from the hinge portion and on which the bearings 34 are fitted. Locating plates 39 are held stationary relative to pins 38 by inserted pins 40 as shown in FIG. 2. The hinge portion 36 of cranked pins 35 is secured axially in, and is free to hinge in an outwardly extending rib 41 of the second shaft member designated generally by 42 and comprising a body 43 from which rib 41 extends, and a coupling extension 44 secured to body 43 by screws 45.

The pitch diameter of the hinge portions 36 of cranked pins 35 in ribs 41 is substantially equivalent to the pitch diameter of the rollers 31; consequently if a small inward or outward movement of the rollers 31 occurs, such movement would be in a generally radial direction relative to the central axis. Reaction to the pressure of helicoid 26 on rollers 31 is accordingly then at the working surface 32 of first shaft 33.

It is important that provision be made for temporary screws to pass through ring 4 into pressure sleeve 17 to enable springs 20 to be compressed for assembly and disassembly, or to make other suitable provision for this purpose.

Referring to FIG. 3, casing 48, endplates 49 and 50, pressure sleeve 51, segmental ring 52, taper ring 53, helicoid 54 and cranked pins 55 are similar in form and function to the corresponding items already described with reference to FIGS. 1, 2, 4 and 5. Rollers 56, however, have a first diameter 57 in engagement with helicoid 54, and a second diameter 58 in engagement with first shaft 59. Rollers 56 run on needle bearings 60.

This arrangement of the stepped rollers is principally of value in permitting a wide choice of speed ratios without change in the pitch diameter of the rollers.

It is desirable that the angles of the conical surfaces of the segmental rings locating helicoids be large enough to permit reversible action, and thus obviate excessive pressure on working surfaces. It is further desirable that components of the devices be precisely made in order that dimensional variation and wear may be taken up at a low value of stress in the helicoids.

Notwithstanding relatively low coefficients of adhesion when using durable materials, tests indicate that torques which are substantial in relation to the physical size of the devices may be transmitted at values of surface stress giving long operating life.

It will be understood that while only single stage drives are described herein, compounding of two or more such drives may be arranged in various ways to provide virtually any desired speed ratio.

What I claim is:

1. An epicyclic drive to transmit motion between members on a common rotational axis comprising a first shaft member in rolling contact with at least two equally spaced rollers rotatably mounted on pins carried by a second shaft member, said pins being displaceable radially with respect to the common axis, said rollers being in rolling contact also with the inner surface of a helicoidal component contractibly mounted under pressure within a plurality of segments each having at least one surface cooperating with a surface of an adjacent component in an outer member to exert pressure on the helicoidal component and thereby at the surfaces in rolling contact so as to effect tractive engagement between the members.

2. The device as claimed in claim 1, wherein the said segments are interposed between a ring on one side and a sleeve on the other, said segments being adapted to cooperate with the ring and sleeve to bias said segments radially inwardly relative to said common axis to contract said helicoidal component.

3. The device as claimed in claim 1, wherein each of the said rollers is rotatably mounted on offset portions of cranked pins carried by the said second shaft member.

4. The device as claimed in claim 2, wherein each of the said rollers is rotatably mounted on offset portions of cranked pins carried by the said second shaft member.

5. The device as claimed in claim 1, wherein the said rollers have a first diameter in rolling contact with the first shaft member, and a second diameter in rolling contact with the said helicoidal component.

6. The device as claimed in claim 2, wherein the said rollers have a first diameter in rolling contact with the first shaft member, and a second diameter in rolling contact with the said helicoidal component.

7. The device as claimed in claim 3, wherein the said rollers have a first diameter in rolling contact with the first shaft member, and a second diameter in rolling contact with the said helicoidal component.

8. The device as claimed in claim 4, wherein the said rollers have a first diameter in rolling contact with the first shaft member, and a second diameter in rolling contact with the said helicoidal component.

* * * * *